United States Patent
Voigt et al.

(10) Patent No.: US 10,824,342 B2
(45) Date of Patent: Nov. 3, 2020

(54) MAPPING MODE SHIFT BETWEEN MAPPING MODES THAT PROVIDES CONTINUOUS APPLICATION ACCESS TO STORAGE, WHEREIN ADDRESS RANGE IS REMAPPED BETWEEN SAID MODES DURING DATA MIGRATION AND SAID ADDRESS RANGE IS ALSO UTILIZED BYPASS THROUGH INSTRUCTIONS FOR DIRECT ACCESS

(71) Applicant: HEWLETT PACKARD ENTERPRISE DEVELOPMENT LP, Houston, TX (US)

(72) Inventors: Douglas L Voigt, Boise, ID (US); Andrew C. Walton, Palo Alto, CA (US); Boris Zuckerman, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/114,520

(22) PCT Filed: Feb. 28, 2014

(86) PCT No.: PCT/US2014/019586
§ 371 (c)(1),
(2) Date: Jul. 27, 2016

(87) PCT Pub. No.: WO2015/130314
PCT Pub. Date: Sep. 3, 2015

(65) Prior Publication Data
US 2016/0342341 A1  Nov. 24, 2016

(51) Int. Cl.
*G06F 3/06* (2006.01)
*G06F 9/50* (2006.01)
*G06F 13/14* (2006.01)

(52) U.S. Cl.
CPC .......... *G06F 3/0617* (2013.01); *G06F 3/0647* (2013.01); *G06F 3/0679* (2013.01);
(Continued)

(58) Field of Classification Search
CPC combination set(s) only.
See application file for complete search history.

(56) References Cited

U.S. PATENT DOCUMENTS 6,202,124 B1 * 3/2001 Kern ..................... G06F 3/0619
                                                          711/100
6,321,233 B1 * 11/2001 Larson ..................... G06F 3/14
(Continued)

FOREIGN PATENT DOCUMENTS

| CN | 101490651 A | 7/2009 |
| CN | 102483714 A | 5/2012 |

(Continued)

OTHER PUBLICATIONS

Fusionio.Com, "ioMemory Virtual Storage Layer (VSL)," (Web Page), Mar. 25, 2011, 3 pages, available at http://www.fusionio.com/overviews/vsl-technical-overview.

(Continued)

*Primary Examiner* — William B Partridge
*Assistant Examiner* — Chie Yew
(74) *Attorney, Agent, or Firm* — Trop, Pruner & Hu, P.C.

(57) ABSTRACT

A plurality of mapping modes may be shifted between in real time while maintaining continuous memory mapped access to an application. Data may be migrated between different types storage devices and/or interconnects. The shift between the plurality of mapping modes may be based on a change to the type storage device and/or type of interconnect for the data migration.

20 Claims, 5 Drawing Sheets

(52) U.S. Cl.
CPC .......... *G06F 3/0688* (2013.01); *G06F 9/5016* (2013.01); *G06F 13/14* (2013.01)

(56) References Cited

U.S. PATENT DOCUMENTS

| | | | |
|---|---|---|---|
| 6,473,845 | B1 | 10/2002 | Hornung et al. |
| 6,691,245 | B1* | 2/2004 | DeKoning .......... G06F 11/2028 714/15 |
| 6,741,366 | B2 | 5/2004 | Ishikawa et al. |
| 6,901,481 | B2 | 5/2005 | Olson |
| 7,032,228 | B1* | 4/2006 | McGillis .............. G06F 3/0607 709/217 |
| 7,222,348 | B1* | 5/2007 | Athreya ............... G06F 13/102 719/321 |
| 7,281,104 | B1* | 10/2007 | Tsypliaev ............. G06F 3/0617 709/222 |
| 7,644,239 | B2 | 1/2010 | Ergan et al. |
| 8,174,520 | B2 | 5/2012 | Lin |
| 8,219,758 | B2 | 7/2012 | Wang et al. |
| 8,260,841 | B1* | 9/2012 | Maity .................. G06F 11/301 370/438 |
| 8,266,407 | B2 | 9/2012 | Karamcheti et al. |
| 8,527,693 | B2 | 9/2013 | Flynn et al. |
| 8,898,417 | B1 | 11/2014 | Post et al. |
| 9,223,686 | B1 | 12/2015 | Gupta et al. |
| 9,383,926 | B2 | 7/2016 | Law |
| 9,652,391 | B2 | 5/2017 | Kruckemyer et al. |
| 9,690,716 | B2 | 6/2017 | Li et al. |
| 9,836,232 | B1 | 12/2017 | Vasquez et al. |
| 9,886,210 | B2 | 2/2018 | Frank et al. |
| 9,977,758 | B1 | 5/2018 | Schumacher et al. |
| 10,002,077 | B2 | 6/2018 | Zuckerman et al. |
| 2002/0194558 | A1 | 12/2002 | Wang et al. |
| 2005/0015646 | A1* | 1/2005 | Okada ................. G06F 3/0604 714/5.1 |
| 2005/0125456 | A1 | 6/2005 | Hara et al. |
| 2005/0262306 | A1 | 11/2005 | Nenov et al. |
| 2006/0026339 | A1* | 2/2006 | Rostampour ......... G06F 3/0605 711/103 |
| 2007/0220306 | A1* | 9/2007 | Childs ................. G06F 11/0727 714/6.3 |
| 2008/0109629 | A1* | 5/2008 | Karamcheti .......... G06F 9/5016 711/170 |
| 2009/0164696 | A1* | 6/2009 | Allen ................... G06F 12/0246 711/1 |
| 2009/0198873 | A1 | 8/2009 | Tzeng |
| 2011/0153908 | A1 | 6/2011 | Schaefer et al. |
| 2012/0054746 | A1* | 3/2012 | Vaghani ............... G06F 9/5022 718/1 |
| 2012/0079170 | A1 | 3/2012 | Chang et al. |
| 2012/0290785 | A1 | 11/2012 | Ergan et al. |
| 2012/0297147 | A1 | 11/2012 | Mylly et al. |
| 2012/0303686 | A1 | 11/2012 | Ananthanarayanan et al. |
| 2012/0317348 | A1 | 12/2012 | Tzeng |
| 2012/0317385 | A1* | 12/2012 | Driever ................ G06F 13/126 711/165 |
| 2013/0036128 | A1* | 2/2013 | Ben-Tsion ............ G06F 17/303 707/756 |
| 2013/0111103 | A1 | 5/2013 | Dodson et al. |
| 2013/0185503 | A1 | 7/2013 | Bhatta |
| 2013/0275661 | A1 | 10/2013 | Zimmer et al. |
| 2014/0297935 | A1 | 10/2014 | Post et al. |
| 2014/0297938 | A1 | 10/2014 | Puthiyedath et al. |
| 2015/0012690 | A1 | 1/2015 | Bruce et al. |
| 2015/0081644 | A1 | 3/2015 | Pitts |
| 2015/0081998 | A1 | 3/2015 | Post et al. |
| 2015/0253994 | A1 | 9/2015 | Takada et al. |
| 2015/0331677 | A1 | 11/2015 | Kimura |
| 2017/0308479 | A1 | 10/2017 | Voigt et al. |
| 2017/0329554 | A1 | 11/2017 | Voigt et al. |
| 2018/0074715 | A1 | 3/2018 | Farmahini-Farahani et al. |

FOREIGN PATENT DOCUMENTS

| | | |
|---|---|---|
| CN | 102804152 A | 11/2012 |
| EP | 2246786 A1 | 11/2010 |
| WO | WO-2013048451 A1 | 4/2013 |
| WO | WO-2013048490 A1 | 4/2013 |
| WO | WO-2013055312 A1 | 4/2013 |
| WO | 2014/100546 A1 | 6/2014 |

OTHER PUBLICATIONS

International Search Report & Written Opinion received in PCT Application No. PCT/US2014/019586, dated Oct. 30, 2014, 9 pages.

Coburn, J. et al., "NV-heaps: Making Persistent Objects Fast and Safe with Next-generation, Non-volatile Memories," (Research Paper), Mar. 5-11, 2011, 13 pages, available at http://cseweb.ucsd.edu/~swanson/papers/Asplos2011NVHeaps.pdf.

Elinux.Org, "Application Init Optimizations," (Web Page), May 13, 2009, 5 pages, available at http://elinux.org/Application_Init_Optimizations.

International Search Report & Written Opinion received in PCT Application No. PCT/US2015/022946, dated Feb. 23, 2016, 12 pages.

International Search Report & Written Opinion received in PCT Application No. PCT/US2015/024159, dated Feb. 23, 2016, 10 pages.

Rudoff, A., "Programming Models for Emerging Non-volatile Memory (NVM) Technologies," (Research Paper), Usenix.org, vol. 38, No. 3, Jun. 2013, 6 pages, available at https://www.usenix.org/system/files/login/articles/08_rudoff__040-045_final.pdf.

VMware, Inc., "Understanding Memory Resource Management in VMwaree ESXTM Server," (Research Paper), White Paper, Dec. 15, 2002, 20 pages, available at http://www.vmware.com/files/pdf/perf-vsphere-memory_management.pdf.

Andries Brouwer, "MMAP(2)," Dec. 31, 2013, Linux Programmer's Manual, <https://web.archive.org/web/20131231045436/http://man7.org/linux/man-pages/man2/mmap.2.html>.

die.net, "mmap(2)—Linux man page," Dec. 4, 2013, <https://web.archive.org/web/20131204082903/https://linux.die.net/man/2/mmap>.

International Preliminary Report on Patentability received in PCT Application No. PCT/US2014/019586, dated Sep. 15, 2016, 6 pages.

Leah Schoeb, "Why is persistent cache important?" Jul. 10, 2013, SearchStorage.com, <https://searchstorage.techtarget.com/answer/Why-is-persistent-cache-important?vgnext fmt—print>.

Mark Nielsen, "How to use a Ramdisk for Linux," Nov. 1, 1999, <http://www.linuxfocus.org/English/November1999/article124.html>.

Snia, "NVM Programming Model (NPM)," Dec. 21, 2013, Version 1, <https://www.snia.org/sites/default/files/NVMProgrammingModel_v1.pdf>.

Wikipedia, "mmap," Dec. 16, 2013, <https://en.wikipedia.org/w/index.php?title=Mmap&oldid=586402456>.

zbr, "Pure in-memory cache VS persistent cache?," Feb. 13, 2013, ioremap.net, <http://www.ioremap.net/2013/02/13/pure-in-memory-cache-vs-persistent-cache/>.

How it Works: Intel SSD Caching; Bach, Matt; Puget Systems, Jun. 29, 2012; retrieved from https://www.pugetsystems.com/labs/articles/How-it-Works-Intel-SSD-Caching-148/on Feb. 7, 2019 (Year: 2012).

International Preliminary Report on Patentability received for PCT Patent Application No. PCT/US2015/024159, dated Oct. 12, 2017, 7 pages.

International Preliminary Report on Patentability received for PCT Patent Application No. PCT/US2015/022946, dated Oct. 12, 2017, 9 pages.

"Filesystem in Userspace," Dec. 28, 2013, <https://web.archive.org/web/20131228094545/http://fuse.sourceforge.net/>, 3 pages.

Appuswamy et al., "Cache, cache everywhere, flushing all hits down the sink: On exclusivity in multilevel, hybrid caches", 29th Symposium on Mass Storage Systems and Technologies, 2013, 14 pages.

(56) References Cited

OTHER PUBLICATIONS

Lee at al., "Eliminating Periodic Flush Overhead of File I/O with Non-Volatile Buffer Cache", Eee Transactions on Computers, vol. 65, No. 4, Aug. 18, 2014, pp. 1145-1157.

Libfuse, "Warning: unresolved security issue", available online at <https://web.archive.org/web/20170104054750/https://github.com/libfuse/libfuse>, Jan. 4, 2017, 3 pages.

Liu et al, "RAF: A Random Access First Cache Management to Improve SSD-Based Disk Cache", Fifth International Conference on Networking, Architecture, and Storage, 2010, pp. 492-500.

* cited by examiner

| To -> <br><br> From: | Standard | Emulated local | Emulated Remote | Volatile Mapped | Direct NV Mapped | NV Mapped Remote Block | NV Mapped Remote Emulated Block |
|---|---|---|---|---|---|---|---|
| Standard | | Block Migrate | Block Migrate | MMap | MMap | Migrate & MMap | Migrate & MMap |
| Emulated Local | Block Migrate | | Block Migrate | N/A | MMap | Migrate & MMap | Migrate & MMap |
| Emulated Remote | Block Migrate | Block Migrate | | MMap | Migrate & MMap | N/A | MMap |
| Volatile Mapped | Unmap | Unmap | Unmap | | Remap | Remap | Remap |
| Direct NV Mapped | Unmap & Migrate | Unmap | Unmap & Migrate | Remap | | Migrate | Migrate |
| NV Mapped Remote Block | Unmap & Migrate | Unmap | Unmap & Migrate | Remap | Migrate | | Migrate |
| NV Mapped Remote Emulated Block | Unmap & Migrate | Unmap & Migrate | Unmap | Remap | Migrate | Migrate | |

MAPPING MODE SHIFT BETWEEN MAPPING MODES THAT PROVIDES CONTINUOUS APPLICATION ACCESS TO STORAGE, WHEREIN ADDRESS RANGE IS REMAPPED BETWEEN SAID MODES DURING DATA MIGRATION AND SAID ADDRESS RANGE IS ALSO UTILIZED BYPASS THROUGH INSTRUCTIONS FOR DIRECT ACCESS

BACKGROUND

Due to recent latency improvements in non-volatile memory (NVM) technology, such technology is being integrated into data systems. Servers of the data systems may seek to write data to or read data from the NVM technology. Users, such as administrators and/or vendors, may be challenged to integrate such technology into systems to provide lower latency.

BRIEF DESCRIPTION OF THE DRAWINGS

The following detailed description references the drawings, wherein:

FIG. 3 is an example table illustrating operations by the driver device of FIG. 2 for shifting between mapping modes;

DETAILED DESCRIPTION

Figure 1:
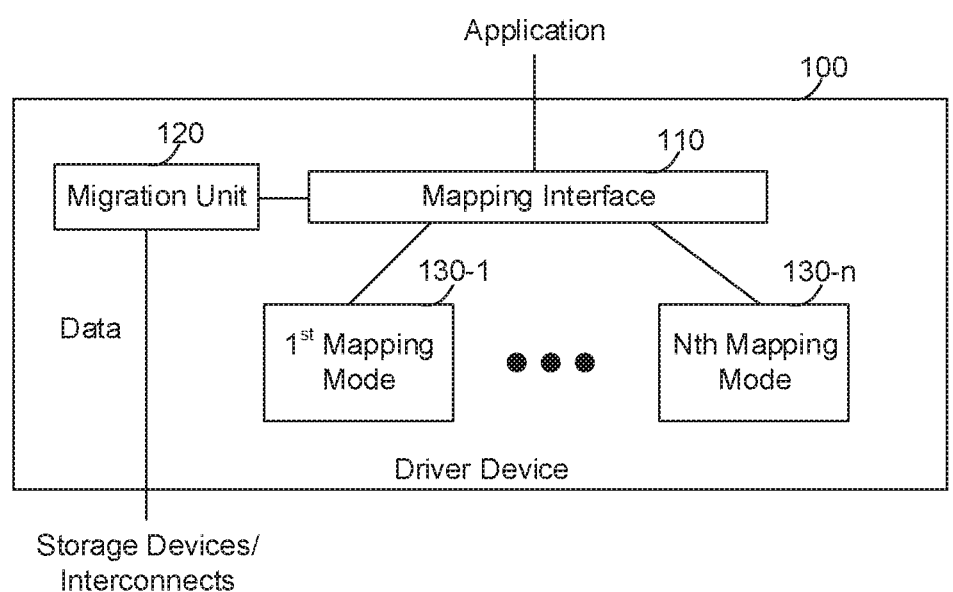
FIG. 1 is an example block diagram of a driver device to shift between a plurality of mapping modes.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

When using new memory-speed non-volatile memory (NVM) technologies (such as Memristor-based, Spin-Torque transfer, and Phase Change memory), low latency may be enabled through memory mapping which requires that applications be modified to synchronize or flush writes to NVM, or use appropriate libraries that do so. For legacy compatibility reasons, and due to scalability limitations of memory interconnects, block emulation on top of NVM may be common. Therefore, some storage presented to an application as block devices may be directly memory mapped, while other block devices may need to be memory mapped using the legacy approach of allocating volatile memory and synchronizing to disk.

Current memory mapped storage implementations may use volatile memory (VM) to allow data that has a permanent location on block storage to be manipulated in memory and then written back to disk using a sync command. Direct memory mapping of NVM and block emulation backed by NV may also be carried out.

Examples may provide a driver device that allows applications to memory map any block storage regardless of where the storage is located. Further, the driver device may able to dynamically shift memory mapped storage between legacy and direct mapping in real time. Examples of the driver device may also allow memory mapping of ranges within block storage regardless of the nature of the software that is interposed between the application and the block storage. Further, the driver device may allow for migrating data between locations or types of storage media or interconnects while maintaining continuous memory mapped access.

An example driver device may include a mapping interface and a migration unit. The mapping interface may shift between a plurality of mapping modes in real time while maintaining continuous memory mapped access to an application. The migration unit may migrate data between different types storage devices and/or interconnects. The mapping interface may shift between the plurality of mapping modes based on a change to at least one of the type storage device and the type of interconnect for the data migration. The driver device may selectively bypass software interposed between the driver device and the application. The software may include at least one of a file system and object store.

Thus, examples may allow for applications and middleware to interact with storage through a single block and memory abstraction. This may simplify system software environments where many types of middleware, such as various file systems and databases, use memory mapping. This may also simplify clustering software by allowing all nodes to uniformly interact with all types of storage through arbitrarily distant nodes. This abstraction implemented by the driver device may further hide differences between storage devices and interconnects, allowing the memory mapping approach to be chosen and changed in real time without application disruption.

Referring now to the drawings. FIG. 1 is an example block diagram of a driver device 100 to shift between a plurality of mapping modes. The driver device 100 may include any type of device to interface and/or map a storage device and/or memory, such as a controller, a driver, and the like. The driver device 100 is shown to include a mapping interface 110 and a migration unit 120. The mapping interface 110 and migration unit 120 may include, for example, a hardware device including electronic circuitry for implementing the functionality described below, such as control logic and/or memory. In addition or as an alternative, the mapping interface 110 and migration unit 120 may be implemented as a series of instructions encoded on a machine-readable storage medium and executable by a processor.

The mapping interface 110 may shift between a plurality of mapping modes 130-1 to 130-$n$ where n is a real number, in real time while maintaining continuous memory mapped access to an application (not shown), The migration unit 120 may migrate data between different types storage devices and/or interconnects (not shown). The mapping interface may shift between the plurality of mapping modes based on a change to at least one of the type storage device and the type of interconnect for the data migration. The interconnect may also be used for application access to memory mapped data.

The driver device 100 may selectively bypass software (not shown) interposed between the driver device and the application. The software may include at least one of a file system and object store. The term mapping may refer to a technique for incorporating one or more memory addresses of a device, such as a remote storage device, into an address table of another device, such as a local NVM of a main device.

Figure 2:
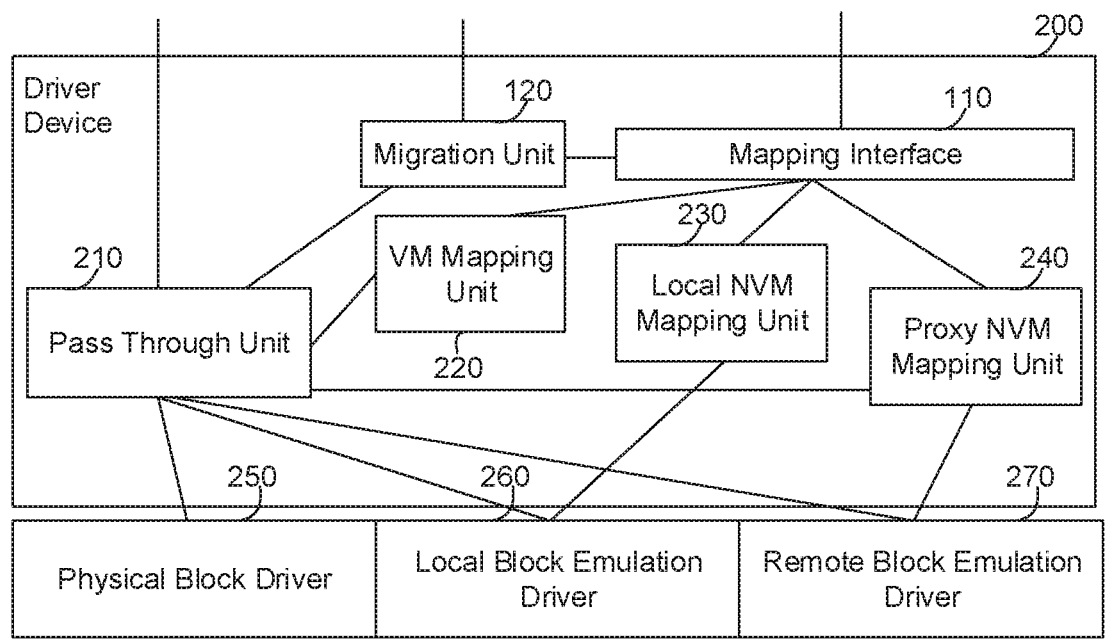
FIG. 2 is another example block diagram of a driver device to shift between a plurality of mapping modes.

FIG. 2 is another example block diagram of a driver device 200 to shift between a plurality of mapping modes. The driver device 200 may include any type of device to interface and/or map a storage device and/or memory, such as a controller, a driver, and the like. Further, the driver device 200 of FIG. 2 may include at least the functionality and/or hardware of the driver device 100 of FIG. 1. For instance, the driver device 200 is shown to include the mapping interface 110 and migration unit 120.

The driver device 200 is also shown to include a pass through unit 210, a volatile memory (VM) mapping unit 220, a local NVM mapping unit 230, and a proxy NVM mapping unit 240. The pass through. VM mapping, local NVM mapping and proxy NVM mapping units 210, 220, 230, and 240 may include, for example, a hardware device including electronic circuitry for implementing the functionality described below, such as control logic and/or memory. In addition or as an alternative, the pass through, VM mapping, local NVM mapping and proxy NVM mapping units 210, 220, 230, and 240 may be implemented as a series of instructions encoded on a machine-readable storage medium and executable by a processor.

Applications, file systems, object stores and/or a map-able block agent (not shown) may interact with the various interfaces of the driver device 200, such as through the pass-through unit 210, the migration unit 120 and/or the mapping interface 110. The driver device 200 may, in turn, interact with standard block device drivers for any type of physical, virtual or emulated block devices, regardless of whether the block devices are local to a main device (not shown) including the driver device 200 or remote from the main device. The main device may be, for example, a server, a secure microprocessor, a notebook computer, a desktop computer, an all-in-one system, a network device, a controller, and the like.

The VM mapping unit 220 may map to a local VM (not shown) directly accessible to the main device via a physical block driver 250. The local NVM mapping unit 230 may map to a local NVM directly accessible to the main device, via a local block emulation driver 260. The proxy NVM mapping unit 240 may use the local NVM to memory map to a remote storage device (not shown) that is not directly accessible as memory by the main device, via a remote block emulation driver 270.

The mapping interface 110 may interface with the VM, local NVM and proxy NVM mapping units 220, 230 and 240 to shift between the plurality of mapping modes. For instance, the mapping interface 110 may select the VM mapping unit 220 if the local NVM is not available. The mapping interface 110 may select the local NVM mapping unit 230 if a target storage is locally accessible via a memory bus. The mapping interface 110 may select the proxy NVM mapping unit 240 if the target storage is not locally accessible via the memory bus.

The pass through unit 210 may provide direct access to a plurality of the storage devices accessible to the main device. The plurality of storage devices may include at least one of physical, virtual and emulated block devices that are local and/or remote to the main device. The mapping interface 110 may indicate to at least one of the application and an agent interfacing with the application that all sync operations are to be passed through the driver device 200.

The mapping interface 110 may pass a block address range to be remapped to the pass through unit 210, based on a type of shift between the plurality of mapping modes. The pass through unit 210 may queue any input/output (I/O) and sync requests to the block address range to be remapped, during a remapping operation. The pass through unit 210 may direct at least one of read and write requests to at least one of the source and destination addresses to the source address, if data migration is not complete.

The mapping interface 110 may call on an operating system (OS) (not shown) to disassociate current virtual addresses from physical memory without de-allocating the physical memory during the remapping operation, with subsequent paging I/O requests by the OS to be queued by the pass through unit 210. The mapping interface 110 may prevent the OS from allocating at least one of new physical memory and a different type of physical memory, during the remapping operation. The mapping interface 110 may select the VM mapping unit 220 to map using a same virtual address range, if at least one of a source and a destination of the migration is already mapped to the local NVM.

The migration unit 120 may interact with the mapping interface 110 to orchestrate proper memory mapping operations throughout the migration process. In some, cases, other software may also participate in the migration. For these cases, the migration unit 120 may only coordinate memory map operations but not actually perform the migration itself. The migration unit 120 may delegate the migration process to a virtualizer (not shown) having a data path to both the source and destination, if the data being migrated is to be shared. The migration unit 120 may call the mapping interface 110 after all the data is migrated to remap virtual address ranges associated with the migration.

The mapping interface 110 may select one of the VM, local NVM and proxy NVM mapping units 220, 230 and 240 to remap to a new location of the migrated data using the same virtual addresses, in response to the call of the of the migration unit 120. The data may be migrated before being memory mapped and the data may be migrated after being unmapped. Thus, the driver device 200 may use any of three mapping units 220, 230 and 240 depending on a location of the storage device, the type of the storage device and characteristics of an interconnect to the storage device. Using examples of the driver device 200 for memory mapping may allow for a range of memory mapping and migration use cases to be abstracted by a single service, as explained further in FIG. 3

FIG. 3 is an example table 300 illustrating operations by the driver device 200 of FIG. 2 for shifting between mapping modes. The driver device 200 may handle shifting between the following range of use cases: standard block access (such as for traditional block devices like hard disk drive (HDD) or solid state drive (SSD) access); emulated local block access (such as for block access to a local NVM); emulated remote block access (such as for block access to a remote NVM); volatile memory mapped (such as for legacy memory mapping for systems with no access to NVM); direct NV memory mapped (such as direct memory mapping for systems with access to local or remote NVM that is used for block emulation and is sufficiently low latency to also be directly memory mapped); NV Memory Mapped Remote Block (such as the use of local NVM to memory map storage that can only be accessed as block, either because it is an SSD or HDD or because memory-to-memory RDMA is not supported); and NV Memory Mapped Remote Emulated Block (such as the use of local NVM to memory map remote NVM that can not be accessed as memory because it is not low latency enough for direct load/store access but does support memory-to-memory RDMA).

As shown in the table 300, the mapping interface 110 may trigger a memory mapping for the shift between the plurality of mapping modes if shifting from at least one of a standard, emulated local and emulated remote block access system to at least one of a volatile, direct non-volatile (NV), remote NV and emulated remote NV memory mapped system. The mapping interface 110 may trigger an un-mapping for the shift between the plurality of mapping modes if shifting from at least one of the volatile, direct non-volatile (NV), remote NV and emulated remote NV memory mapped system to at least one of the standard, emulated local and emulated remote block access system.

The mapping interface 110 may trigger a remapping for the shift between the plurality of mapping modes if shifting from a volatile memory mapped system to at least one of the direct non-volatile (NV), remote NV and emulated remote NV memory mapped system. The mapping interface 110 may also trigger a remapping for the shift between the plurality of mapping modes if shifting from at least one of a direct NV, remote NV and emulated remote NV memory mapped system to a volatile memory mapped system.

The migration unit 120 may not migrate data if the mapping interface is shifting at least one of to and from the volatile memory mapped system, shifting from at least one of the standard and emulated local block access system to the direct NV memory mapped system, shifting from the emulated local block access system to at least one of the remote NV and emulated remote NV memory mapped system, shifting from at least one of direct NV and remote NV memory mapped system to the emulated local block access system, and shifting from the emulated remote NV memory mapped system to the emulated remote block access system. The migration unit 120 may migrate data if the mapping interface is shifting between a remainder of any one of the standard block access system, emulated local block access system, emulated remote block access system, direct NV memory mapped system, remote NV memory mapped system and emulated remote NV memory mapped system.

Both the source and destination of the migration may be accessible through the driver device 200. The source of the migration may be a range of block or virtual memory addresses. The destination may be a range of block or physical memory addresses to which the data is being moved. The migration may proceed as follows. Software above the driver device 200 may allocate destination space prior to migration, although that space may be thinly provisioned from the block access point of view. The, software above the driver device 200 may make a "Prepare Migration" call to the driver device 200. The driver device 200 may allocate a migration control block for the migration.

If either the source or destination of the migration is already mapped to the local NVM on the main device, then the mapping interface 110 may carry out a remap operation, as described below, using a mmap unit 440 shown in FIGS. 5 and 6, to switch to VM (like DRAM), but to continue using the same virtual addresses as before. The driver device 200 may forward the block address range(s) of the source and destination to the pass through unit 210 with a high watermark indicating that migration has not yet begun. This may cause all reads and writes to either the source or destination addresses to be directed to the source addresses.

The driver device 200 may return from the "Prepare to migrate" call passing a migration handle back to it. The Software above the driver device 200 may unpin the storage from its prior location. The software above the driver device 200 may modify its storage allocation tables to reflect the new address of the storage. The storage may remain memory mapped at its original virtual address. The software above the driver device 200 then calls the driver device 200's migration unit 120 and passes in the migration handle.

If the system is configured such that the data being migrated might be shared, then the migration process may be delegated to an entity such as a virtualizer or disk array (not shown) that is in the data path to both the source and the destination. If the data might be shared and no such entity exists, then the migration may be aborted, in which case the mmap 440 may revert to that which was in use before the migration using the remap operation. If the migration is to be delegated, then the migration may be coordinated with the delegate in a manner similar to that described above. However, the driver device 200 may instead move the high water mark past the last block in the range.

If the migration was not delegated, then the driver device 200 may chooses a buffer size. For each buffer size unit in the address range(s) to be migrated, the driver device 200 may 1) start queuing new IO's that overlap the unit, 2) wait for IO's in flight that overlap the range to complete, 3) copy the unit from the source to the destination, 4) move the high water mark beyond the unit and 5) release the queue of IO's.

Any IO's received during the migration process that overlap either the source or destination ranges and that are above the high water mark may be delivered to the appropriate offset in the source address ranges. Any IO's received during the migration process that overlap either the source or destination ranges and that are below the high water mark are delivered to the appropriate offset within the destination address ranges. The units migrated might be the size of pages. In some migrations, the driver device 200 may tell the OS to change the virtual to physical mapping of each page as it is migrated so that the pages look contiguous to the OS even though data is mapped at two different addresses.

Units are thus migrated in sequence. When the last unit has been migrated, the migration unit 120 may call the mmap unit 440 to remap the virtual address ranges associated with the migration to use the memory mapping mode appropriate to the new location of the data but using the same virtual addresses as before. As migration has completed, the migration control block may be deleted and the migrate function may return to the software that called it. The software may pin the data at its new location.

Other migration approaches may also be used depending on what kind of storage virtualization or caching is used in the system. In any of these approaches, the remap function may be used as described above to make migration compatible with continuous memory mapping. The memory map call to the driver device 200 device may result in a memory mapping mode being chosen based on whether NVM is available and whether the data is accessible to the main device over a memory bus. In the first memory mapping method. VM mapping, durability may only be assured by writing data to block storage during the sync command, if the OS has not already done so. The OS may write dirty VM (such as DRAM) pages to disk in the background.

The second memory mapping method, local NVM mapping, may be used when the block storage being memory mapped is emulated and backed by NVM that is directly accessible to the main device (such as a server). Then it is memory mapped in place without the use of VM. This may be a more efficient method of memory mapping as durability can be achieved using processor flush instructions alone. The third memory mapping method is Proxy NVM mapping, in which local NV memory is used to memory map devices that cannot be accessed as memory.

Some of the transitions in the table 300 may represent movement of data from one location to another. These combine the migration and memory mapping mechanisms described above to get data to the desired location and memory map it. Transitions from memory mapped mode to block access mode may be achieved using the unmap mechanism described below. Similarly, unmap and migrate may combine two operations in sequence in order to impose the desired means of access and data location.

The remap mechanism may change the memory mapping approach used for a given piece of data. In operation, the driver device 200 may notify the agent that all sync operations must be passed to the driver device 200. The mapping interface 110 may create a control block describing the block address range(s) to be remapped and pass it to the pass through unit 210. As of that point, the pass through unit 210 may queue any IO's to those addresses until further notice and waits for all IO's to those ranges to complete. In addition, the remap causes all new sync commands to the range to be queued.

Remap calls on the OS's virtual memory manager may disassociate the current virtual address from physical memory without deallocating the physical memory. Any subsequent accesses to those virtual addresses may cause page faults, which in turn will cause the OS to attempt to page the effected data from the block access path. Those paging IO's may be temporarily blocked by the pass through unit 210 due to step described above. During page fault processing, the OS may attempt to allocate new physical memory for the data. This action by the OS should either avoid allocation or allocate only the correct type of physical memory. Memory allocation by the OS should be avoided if the new memory mapping approach is NVM (not proxied).

If the old mapping approach was DRAM or proxied NVM, then all data may be written in the range being remapped from the physical memory where the data was located to their block locations as known to the pass through unit 210. This may assure that any updates that occurred before the disassociation of virtual addresses are in the block storage locations before any updates that occur after the disassociation. After writing the contents of each old range, the memory for the old range is deallocated.

If the new memory map approach is NVM or proxied NVM, and the OS did not allocate memory, then the mapping interface 110 may allocate memory for the new memory mapping approach. If the new memory map approach is NVM or proxied NVM, then all ranges are read from their block storage locations into the newly allocated VM or NVM. The mapping interface 110 may call on the OS to map the virtual address(es) of the data range(s) to the new location(s). The mapping interface 110 may contact the pass through unit 210 and instruct it to vacuously complete the queued IO's to the relocated ranges. Those ranges have already been filled with the correct data.

Upon completion, the mapping interface 110 may release the queued sync operations, inform the agent that it is to treat syncs according to the new approach and deallocate the remap control block. Thus, for a remap, examples may coordinate the virtual address change with the block access path that will be used to process page faults that occur during the period that the data is disassociated from the virtual address space.

In another instance, examples may write only dirty pages, thus reducing the amount of data flow in the migration. In still another instance, the blocking of the page faults may be skipped and the OS may be allowed to page fault the data back into memory. In this case, instead of blocking I/O's, the pass through unit 210 may redirect reads from block device addresses in the range being remapped to be sourced from the old memory mapped ranges in VM or NVM. If the old VM or NVM page has been deallocated, then reads may be allowed to pass through to the block device. Writes to ranges being remapped may be allowed to pass through as well, because they could only apply to ranges that were already read and reallocated by the demand paging process.

Figure 4:
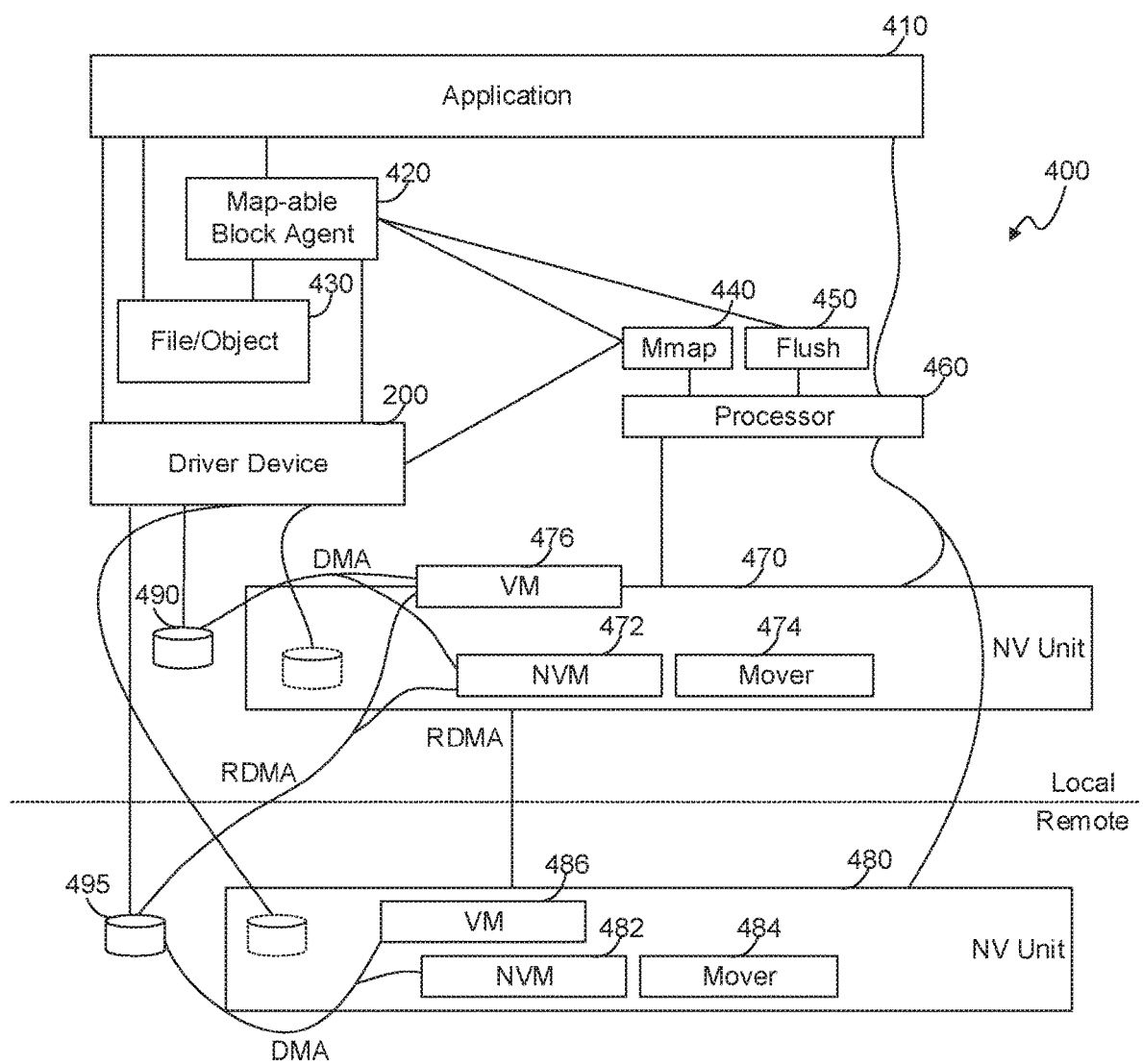
FIG. 4 is an example block diagram of a memory mapping system including the driver device of FIG. 2.

FIG. 4 is an example block diagram of a memory mapping system 400 including the driver device 200 of FIG. 2. In FIG. 2, an application 410 is shown to access storage conventionally through block or file systems, or through a new map-able block agent 420. A local NV unit 470 is shown above the dotted line and a remote NVM unit 480 is shown below the dotted line. The term remote may infer, for example, off-node or off premises. Solid cylinders 490 and 495 may represent conventional storage devices, such as a HDD or SSD, while NVM technologies may be represented as the NV units 470 and 480 containing a NVM 472 and 482 along with dotted cylinders representing block emulation.

Block emulation may be implemented entirely within the driver device 200 but backed by the NVM 472 and 482. Some of the NVM 472 and 482 may be designated "volatile," thus VM 476 and 478 is shown to be (partially) included within the NV units 470 and 480. Movers 474 and 484 may be any type of device to manage the flow of within, to and/or from the NV units 470 and 480. The map-able block agent 420 may represent the ability to memory map any storage whose block address can be ascertained through interaction with the file system or object store 430. Memory mapping may be implemented either by allocating VM to proxy for HDD or SSD devices, or by directly mapping NVM for devices capable of doing so.

Here, the term NVM may refer to storage that can be accessed directly as memory (aka persistent memory) using a processor's 460 load and store instructions or similar. The agent 420 may run in user space while the driver device 200 runs in a kernel of the main device. In some systems, memory mapping may involve the driver device 200 while in other cases the driver device 100 may delegate that function to the agent 420. A memory sync may implemented by the agent 420. However, if the legacy method is used, then the agent 420 may involve the drivers to accomplish I/O. The software represented here as a file system or object store 430 may be adapted to use the memory mapping capability of the driver device 200 directly, in which case the agent 420 would not need to proxy for it.

Thus, the driver device 200 is shown with the ability to access any storage with either block or memory mapped access, regardless of the software that may be interposed between the application 410 and the driver device 200. This may be done by surrounding the interposed software, such as the file system or object store 430, with the map-able block agent 420 above and the driver device 200 below. The interposed software 430 may use the driver device 200 like it would use any standard block driver. The map-able block agent 420 may communicate with driver device on behalf of the interposed software 430 to manage memory mapping. This may still require some interaction with the interposed software 430 as per the following memory mapping process.

The application 410 requests that a range of offsets within a given file, object, volume or other data construct be memory mapped. The agent 420 may be capable of interpreting references to the data construct and probe the interposed software (file system, object store, etc.) to determine the block storage device(s) and address(es) where the data is stored. Even if the data is stored in NVM 472 or 474, it may have an emulated block device address. It may be assumed that the NVM 472 or 474 backing an emulated block device does not have any virtual address unless it was explicitly memory mapped.

If, in probing for the block storage address of the data, the agent 420 discovers that the data is not allocated, then it may force the intervening software 430 to allocate the data. Having ascertained the block storage address of the data, the agent 432 may force the interposed software to avoid 430 relocating or migrating the data without coordinating with the driver device 200. This may be referred to as "pinning" the data. The agent 420 may communicate with the driver device to allocate appropriate virtual memory addresses for the data.

The driver device 200 determines the applicable use case for the memory mapping, as explained above in FIG. 3. The driver device 200 may allocate local memory for mapping. If the block device 480 is emulated out of the local NVM 470, then a virtual address for the data may already be established. Otherwise the driver device may call on the OS to associate a virtual address with the data. The driver device 200 may respond to the agent's 420 map request. The agent 420 may, in turn, respond to the application 410.

Once memory is mapped, the application 410 may call the agent 420 to synchronize data when durability must be assured. The agent 420 may track a use case to determine whether it can simply flush 450 the appropriate data from the processor's cache 460 or whether it also needs to call a sync command implemented by the driver device 200. Some uses may require the latter in order to allow the driver device 200 to do I/O to complete the sync. By depending on the agent for this decision rather than always calling the driver device 200, the sync may be completed in user space without a context switch. In some use cases, remote direct memory access (RDMA) may be used to directly transfer data from one NVM to another NVM 470 and 480 during the sync. Some agent implementations may track the physical address of the memory storing remote emulated block storage so as to complete the sync using RDMA without switching into kernel space.

When memory no longer needs to be mapped, the application 410 may issue an unmap call to the agent 420. The agent 420 may sync the mapped data once more and reverse the process of mapping. To do so, the agent 420 may interact with the map-able block driver device 200 to remove virtual address mappings that did not exist before the corresponding memory map and deallocate memory that was allocated for the purpose of the memory map (if any). The agent 420 may then unpin the data by interacting with the interposed software 430. These actions may be performed directly by the application 410 or by the file, object or other store 430 in examples that do not include the agent 420, such as in FIG. 5 below.

Figure 5:
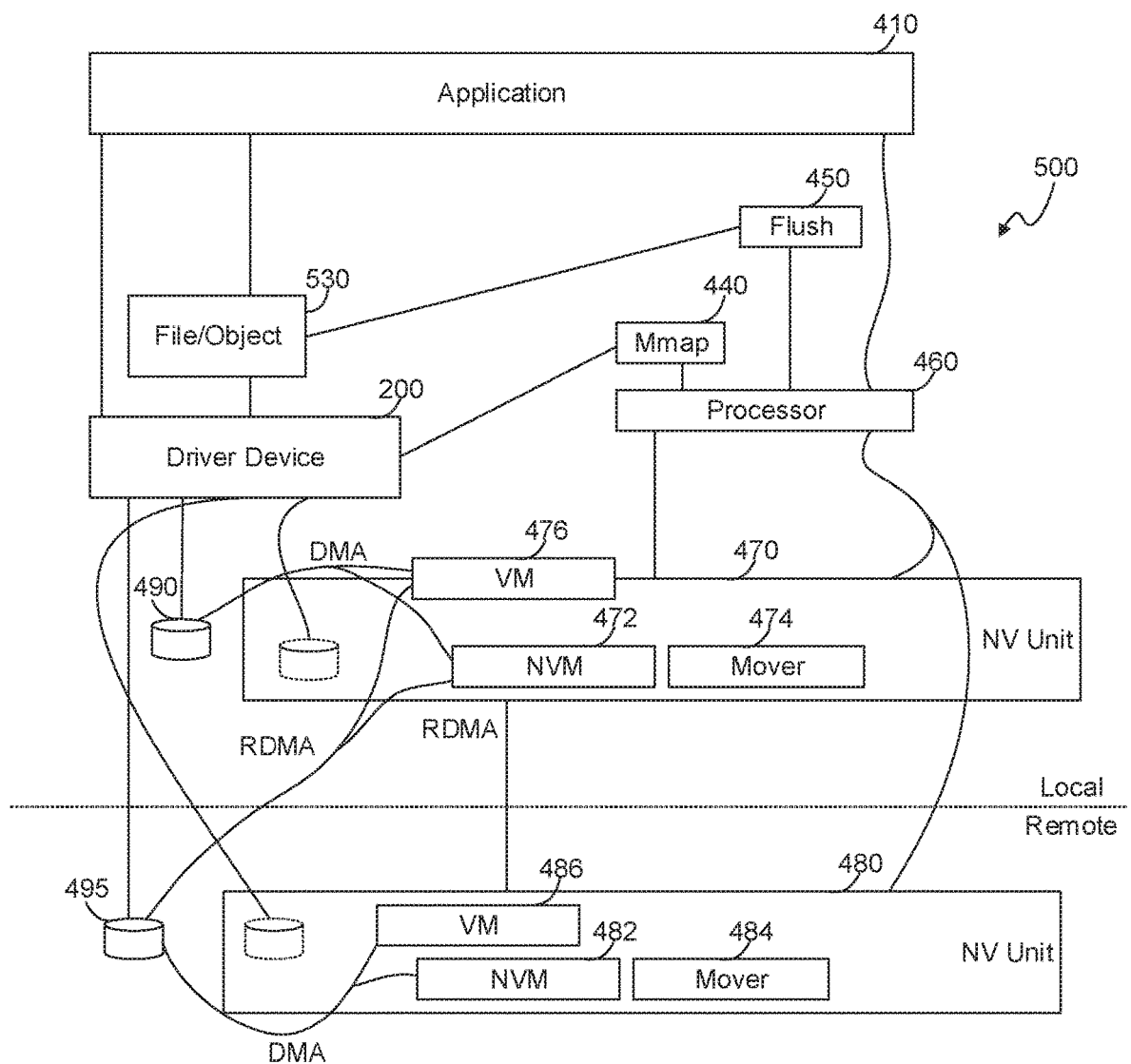
FIG. 5 is another example block diagram of a memory mapping system including the driver device of FIG. 2.

FIG. 5 is another example block diagram of a memory mapping system 500 including the driver device 200 of FIG. 2. The memory mapping system 500 in FIG. 5 may be similar to that described above in FIG. 4, except that the actions of the agent 420 may implemented within the file, object or other store 530. It may also be permissible for the application 410 to interact directly with the driver device 200, including the use of its memory mapping service.

Figure 6:
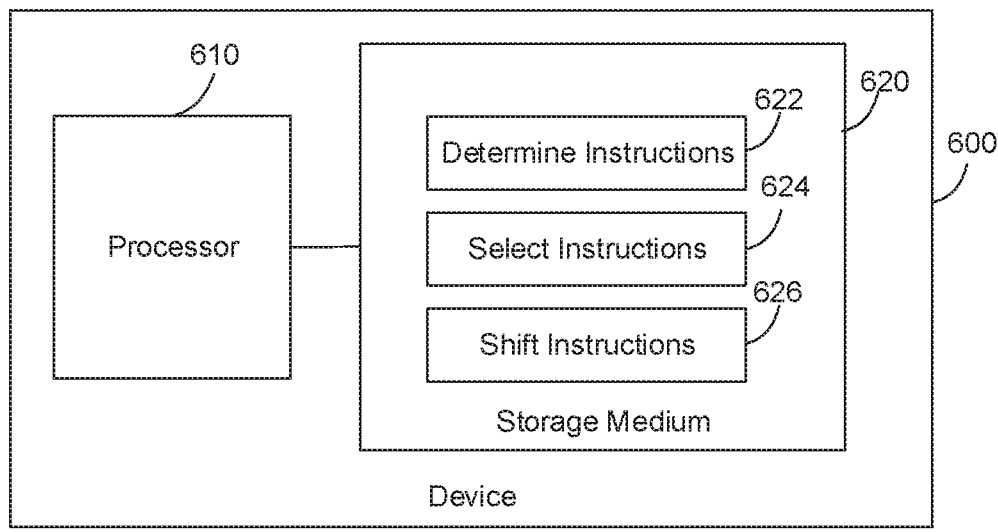
FIG. 6 is an example block diagram of a computing device including instructions for shifting to one of a plurality of mapping modes.

FIG. 6 is an example block diagram of a computing device 600 including instructions for shifting to one of a plurality of mapping modes. In the embodiment of FIG. 6, the computing device 600 includes a processor 610 and a machine-readable storage medium 620. The machine-readable storage medium 320 further includes instructions 622, 624 and 626 for shifting to one of a plurality of mapping modes.

The computing device 600 may be, for example, a secure microprocessor, a notebook computer, a desktop computer, an all-in-one system, a server, a network device, a controller, a wireless device, or any other type of device capable of executing the instructions 622, 624 and 626. In certain examples, the computing device 600 may include or be connected to additional components such as memories, controllers, etc.

The processor 610 may be, at least one central processing unit (CPU), at least one semiconductor-based microprocessor, at least one graphics processing unit (GPU), other hardware devices suitable for retrieval and execution of instructions stored in the machine-readable storage medium 620, or combinations thereof. The processor 610 may fetch, decode, and execute instructions 622, 624 and 626 to implement shifting to one of the plurality of mapping modes. As an alternative or in addition to retrieving and executing instructions, the processor 610 may include at least one integrated circuit (IC), other control logic, other electronic circuits, or combinations thereof that include a number of electronic components for performing the functionality of instructions 622, 624 and 626.

The machine-readable storage medium 620 may be any electronic, magnetic, optical, or other physical storage device that contains or stores executable instructions. Thus, the machine-readable storage medium 620 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 620 can be non-transitory. As described in detail below, machine-readable storage medium 620 may be encoded with a series of executable instructions for shifting to one of the plurality of mapping modes.

Figure 7:
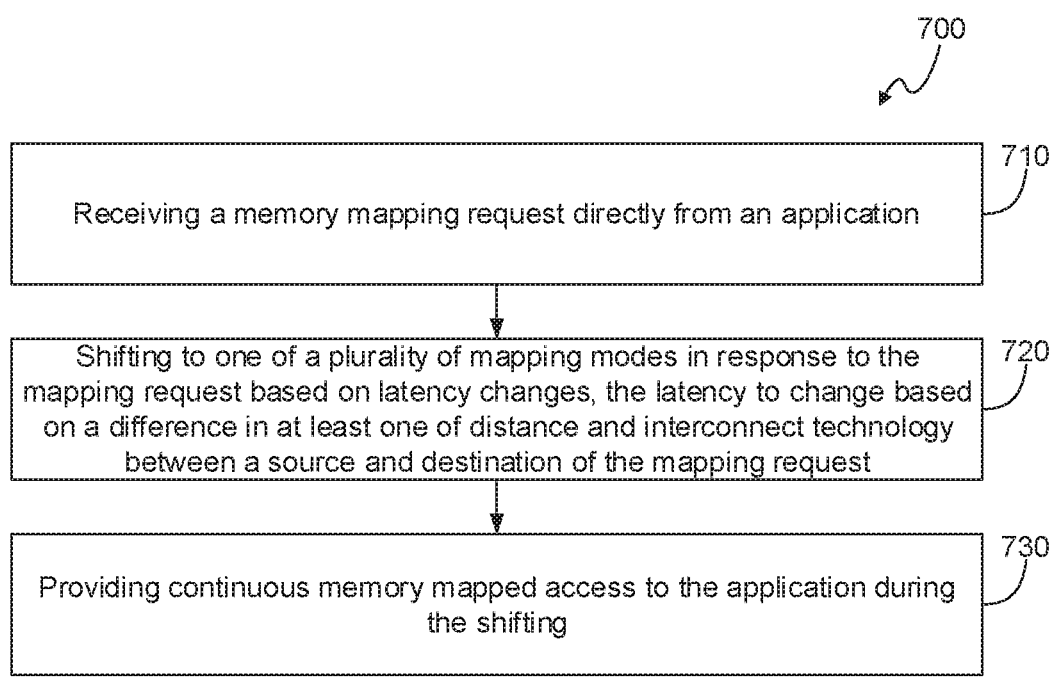
FIG. 7 is an example flowchart of a method for shifting to one of a plurality of mapping modes.

Moreover, the instructions 622, 624 and 626 when executed by a processor (e.g., via one processing element or multiple processing elements of the processor) can cause the processor to perform processes, such as, the process of FIG. 7. For example, the determine instructions 622 may be executed by the processor 610 to determine a source address and a destination address for data to be migrated. The select instructions 624 may be executed by the processor 610 to select one a plurality of memory mapping modes related to at least one of migrating, mapping, remapping and unmapping data based on a type of at least one of storage interface and storage device type for the source and destination addresses.

The shift instructions 626 may be executed by the processor 610 to shift to the selected memory mapping mode without disruption to an application that provides the source and destination addresses. The source address may relate to a range of at least one of block and virtual memory addresses. The destination address may relate to a range of at least one of block and physical memory addresses.

FIG. 7 is an example flowchart of a method 700 for shifting to one of a plurality of mapping modes. Although execution of the method 700 is described below with reference to the driver device 200, other suitable components for execution of the method 700 may be utilized, such as the driver device 100. Additionally, the components for executing the method 700 may be spread among multiple devices (e.g., a processing device in communication with input and output devices). In certain scenarios, multiple devices acting in coordination can be considered a single device to perform the method 700. The method 700 may be implemented in the form of executable instructions stored on a machine-readable storage medium, such as storage medium 620, and/or in the form of electronic circuitry.

At block 710, the driver device 200 receives a memory mapping request directly from an application 410. The receiving, at block 710, may interact with at least one of the application 410, a file system, an object store 430 and a map-able block agent 420 to determine the source and destination of the mapping request.

Then, at block 720, the driver device 200 shifting to one of a plurality of mapping modes in response to the mapping request based on latency changes. The latency may change based on a difference in at least one of distance and interconnect technology between a source and destination of the mapping request.

The plurality of mapping modes may include a direct mapping mode and a legacy mapping mode. The direct mapping mode may map to a non-volatile memory (NVM) 470 or 480 and the legacy mapping mode may map to a volatile memory (VM) 476 or 486 that is synchronized with the NVM 470 or 480. The shifting at block 720 may further select one of the plurality of memory mapped modes based on NVM availability and data accessibility via a memory bus.

At block 730, the driver device 200 may provide continuous memory mapped access to the application 410 during the shifting at block 720. The driver device 200 may hide a difference between at least one of different types of storage devices and storage interconnects from the application 410.

We claim:

1. A device comprising:
a processor;
and a machine-readable storage medium comprising instructions executable on the processor to:
migrate data between different types of storage devices over an interconnect;
shift between a plurality of mapping modes in real time while maintaining continuous application access to storage via the plurality of mapping modes, the shifting based on a change to at least one of a type of the different types of storage devices or a type of the interconnect for the migration of the data, and the shifting comprising remapping a range of block addresses between the plurality of mapping modes;
with proxy non-volatile memory (NVM) mapping instructions, use a local physical NVM to memory map to a remote storage device that is not directly accessible as memory by a main device, wherein the remapping is to shift from or to a first mapping mode that uses the local physical NVM to memory map to the remote storage device;
pass the range of block addresses being remapped to pass through instructions that provide direct access to a plurality of the different types of storage devices accessible to the main device;
during the remapping, call an operating system (OS) to disassociate current virtual addresses associated with the migration of the data from physical memory without de-allocating the physical memory; and during the remapping, prevent the OS from allocating new physical memory.

2. The device of claim 1, wherein the instructions are executable on the processor to:
with volatile memory (VM) mapping instructions, map to a local VM directly accessible to the main device; and
with local NVM mapping instructions, map to the local physical NVM directly accessible to the main device,
wherein the remapping is to shift to or from a second mapping mode that uses the mapping to the local VM or that uses the mapping to the local physical NVM.

3. The device of claim 2, wherein the instructions are executable on the processor to:
select the VM mapping instructions in response to the local physical NVM not being available;
select the local NVM mapping instructions in response to a target storage being locally accessible via a memory bus; and
select the proxy NVM mapping instructions in response to the target storage not being locally accessible via the memory bus.

4. The device of claim 1, wherein the instructions are executable on the processor to indicate to at least one of the application or an agent interfacing with the application that sync operations are to be passed through the device.

5. The device of claim 3, wherein the instructions are executable on the processor to:
select the VM mapping instructions to map using a same virtual address range, in response to at least one of a source and a destination of the migration of the data being already mapped to the local physical NVM, wherein the source and destination are part of the different types of storage devices; and
delegate the migration of the data to a virtualizer having a data path to both the source and destination, in response to the data being migrated being shared.

6. The device of claim 1, wherein the pass through instructions are executable on the processor to:
during the remapping, queue any input/output (I/O) and sync requests to the range of block addresses; and
in response to the migration of the data from a source to a destination not being complete, direct, to sources addresses of the source, requests that access the source addresses of the source, and requests that access destination addresses of the destination, wherein the source and destination are part of the different types of storage devices.

7. The device of claim 2, wherein the instructions are executable on the processor to:
remap a virtual address range associated with the migration of the data; and
select one of the VM mapping instructions, the local NVM mapping instructions, and the proxy NVM mapping instructions to remap to a new location of the migrated data using same virtual addresses in the virtual address range.

8. The device of claim 2, wherein the instructions are executable on the processor to:
select the proxy NVM mapping instructions to perform memory mapping in response to use of the first mapping mode of the plurality of mapping modes; and
select the VM mapping instructions or the local NVM mapping instructions to perform memory mapping in response to use of the second mapping mode of the plurality of mapping modes.

9. A method performed by a device, comprising:
migrating data between different types of storage devices over an interconnect; shifting between a plurality of memory mapping modes in real time while maintaining continuous application access to storage via the plurality of memory mapping modes, the shifting based on a change to at least one of a type of the different types of storage devices or a type of the interconnect for the migration of the data, and the shifting comprising remapping a range of block addresses between the plurality of memory mapping modes;
with proxy non-volatile memory (NVM) mapping instructions, using a local physical NVM to memory map to a remote storage device that is not directly accessible as memory by a main device, wherein the remapping shifts from or to a first memory mapping mode that uses the local physical NVM to memory map to the remote storage device;
pass the range of block addresses being remapped to pass through instructions that provide direct access to a plurality of the different types of storage devices accessible to the main device;
during the remapping, queuing, with the pass through instructions, any input/output (I/O) and sync requests to the range of block addresses being remapped;
and in response to the migration of the data from a source to a destination not being complete, directing, by the pass through instructions to source addresses of the source, requests that access the source addresses of the source, and requests that access destination addresses of the destination, wherein the source and destination are part of the different types of storage devices.

10. The method of claim 9, further comprising:
with volatile memory (VM) mapping instructions, mapping to a local VM directly accessible to the main device; and
with local NVM mapping instructions, mapping to the local physical NVM directly accessible to the main device,
wherein the remapping is to shift to or from a second memory mapping mode that uses the mapping to the local VM or that uses the mapping to the local physical NVM.

11. The method of claim 10, further comprising:
selecting the VM mapping instructions in response to the local physical NVM not being available,
selecting the local NVM mapping instructions in response to a target storage being locally accessible via a memory bus; and
selecting the proxy NVM mapping instructions in response to the target storage not being locally accessible via the memory bus.

12. The method of claim 10, further comprising:
selecting the VM mapping instructions to map using a same virtual address range, in response to at least one of a source and a destination of the migration of the data being already mapped to the local physical NVM, wherein the source and destination are part of the different types of storage devices; and
delegating the migration of the data to a virtualizer having a data path to both the source and destination, in response to the data being migrated being shared.

13. The method of claim 9, further comprising:
indicating to at least one of the application or an agent interfacing with the application that sync operations are to be passed through the device.

14. A non-transitory computer-readable storage medium storing instructions executable by a device to:
migrate data between different types of storage devices over an interconnect;
shift between a plurality of mapping modes in real time while maintaining continuous application access to storage via the plurality of mapping modes, the shifting based on a change to at least one of a type of the different types of storage devices or a type of the interconnect for the migration of the data, and the shifting comprising remapping a range of block addresses between the plurality of mapping modes;
and with proxy non-volatile memory (NVM) mapping instructions, use a local physical NVM to memory map to a remote storage device that is not directly accessible as memory by a main device, wherein the remapping is to shift from or to a first mapping mode that uses the local physical NVM to memory map to the remote storage device;
and pass the range of block addresses being remapped to pass through instructions that provide direct access to a plurality of the different types of storage devices accessible to the main device.

15. The non-transitory computer-readable storage medium of claim 14, wherein the instructions are executable by the device to:
with volatile memory (VM) mapping instructions, map to a local VM directly accessible to the main device; and
with local NVM mapping instructions, map to the local physical NVM directly accessible to the main device,
wherein the remapping is to shift to or from a second mapping mode that uses the mapping to the local VM or that uses the mapping to the local physical NVM.

16. The non-transitory computer-readable storage medium of claim 14, wherein the instructions are executable by the device to:
indicate to at least one of the application or an agent interfacing with the application that sync operations are to be passed through the device.

17. The non-transitory computer-readable storage medium of claim 16, wherein the instructions are executable by the device to:
during the remapping, queue, with the pass through instructions, any input/output (I/O) and sync requests to the range of block addresses being remapped; and
in response to the migration of the data from a source to a destination not being complete, direct, with the pass through instructions to source addresses of the source, requests that access the source addresses of the source, and requests that access destination addresses of the destination, wherein the source and destination are part of the different types of storage devices.

18. The non-transitory computer-readable storage medium of claim 16, wherein the instructions are executable by the device to:
during the remapping, call an operating system (OS) to disassociate current virtual addresses associated with the migration of the data from physical memory without de-allocating the physical memory; and
during the remapping, prevent the OS from allocating at least one of new physical memory or a different type of physical memory.

19. The non-transitory computer-readable storage medium of claim 14, wherein the instructions are executable by the device to:
select VM mapping instructions in response to the local physical NVM not being available;

select local NVM mapping instructions in response to a target storage being locally accessible via a memory bus; and select the proxy NVM mapping instructions in response to the target storage not being locally accessible via the memory bus.

20. The non-transitory computer-readable storage medium of claim 19, wherein the instructions are executable by the device to:

select the VM mapping instructions to map using a same virtual address range, in response to at least one of a source and a destination of the migration of the data being already mapped to the local NVM, wherein the source and destination are part of the different types of storage devices; and delegate the migration of the data to a virtualizer having a data path to both the source and destination, in response to the data being migrated being shared.

* * * * *